United States Patent
Raghupathy et al.

(10) Patent No.: US 10,747,658 B2
(45) Date of Patent: Aug. 18, 2020

(54) SYSTEMS AND METHODS FOR TESTING ONLINE USE-CASE SCENARIOS IN A STAGING ENVIRONMENT

(71) Applicant: PAYPAL, INC., San Jose, CA (US)

(72) Inventors: Durga Prasad Raghupathy, Round Rock, TX (US); Benjamin Jacob White, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/194,736

(22) Filed: Nov. 19, 2018

(65) Prior Publication Data
US 2020/0159653 A1    May 21, 2020

(51) Int. Cl.
*G06F 9/44*    (2018.01)
*G06F 11/36*   (2006.01)
*G06Q 40/02*   (2012.01)

(52) U.S. Cl.
CPC ........ *G06F 11/3696* (2013.01); *G06F 11/366* (2013.01); *G06F 11/3664* (2013.01); *G06Q 40/02* (2013.01)

(58) Field of Classification Search
CPC ............. G06F 11/3696; G06F 11/3684; G06F 11/3692
USPC .................. 717/104–109, 120–122, 134–137
See application file for complete search history.

(56) References Cited

U.S. PATENT DOCUMENTS

| | | | | |
|---|---|---|---|---|
| 6,708,327 B1 * | 3/2004 | Aliphas | ................... | H04L 67/06 717/125 |
| 7,100,195 B1 * | 8/2006 | Underwood | ............ | G06F 9/451 726/2 |
| 7,181,731 B2 * | 2/2007 | Pace | ......................... | G06F 8/60 717/136 |
| 7,401,033 B2 * | 7/2008 | Al-Azzawe | ............ | G06Q 30/02 705/26.8 |
| 7,584,457 B2 * | 9/2009 | Hammerich | ............ | G06F 8/436 717/115 |
| 7,685,577 B2 * | 3/2010 | Pace | ......................... | G06F 8/60 717/103 |
| 7,686,214 B1 * | 3/2010 | Shao | ..................... | G06Q 20/382 235/380 |

(Continued)

OTHER PUBLICATIONS

Bertolino et al, "Enhancing Service Federation Trustworthiness Through Online Testing", IEEE, pp. 66-72 (Year: 2012).*

(Continued)

*Primary Examiner* — Anil Khatri
(74) *Attorney, Agent, or Firm* — Haynes and Boone LLP

(57) ABSTRACT

Methods and systems are presented for automatically configuring a staging environment to facilitate testing of online use-case scenarios for an online service provider. In response to receiving a request to test an online use-case scenario, a user account configuration may be derived from the use-case scenario. Account data for creating a user account is generated based on the user account configuration. The account data is inserted into a database of the staging environment to create the user account within the staging environment. A workflow associated with the online use-case scenario is automatically performed based on the newly generated user account in the staging environment. One or more defects observed while performing the workflow is reported to a user.

19 Claims, 8 Drawing Sheets

(56) References Cited

U.S. PATENT DOCUMENTS

| | | | | |
|---|---|---|---|---|
| 7,770,151 | B2* | 8/2010 | Sanjar | G06F 8/61 |
| | | | | 717/109 |
| 7,949,603 | B1* | 5/2011 | Cao | G06Q 20/042 |
| | | | | 705/35 |
| 7,954,083 | B2* | 5/2011 | Berenbach | G06Q 10/06 |
| | | | | 717/105 |
| 8,069,435 | B1* | 11/2011 | Lai | G06Q 10/10 |
| | | | | 717/106 |
| 8,423,976 | B2* | 4/2013 | Zwirner | G06F 8/52 |
| | | | | 717/136 |
| 8,690,055 | B2* | 4/2014 | Anderson | G06K 19/06196 |
| | | | | 235/379 |
| 8,839,369 | B1* | 9/2014 | Dai | H04L 63/10 |
| | | | | 713/178 |
| 9,098,958 | B2* | 8/2015 | Joyce | G06Q 20/00 |
| 9,262,311 | B1* | 2/2016 | Johnston | G06F 11/3688 |
| 9,633,201 | B1* | 4/2017 | Katz | G06F 21/55 |
| 10,037,264 | B2* | 7/2018 | Chacko | G06F 11/368 |
| 10,121,135 | B1* | 11/2018 | Foroohar | G06Q 20/202 |
| 10,230,727 | B2* | 3/2019 | Hallenborg | H04L 63/08 |

OTHER PUBLICATIONS

Wang et al, "Automatic Generation of System Test Cases from Use Case Specifications", ACM, pp. 385-396 (Year: 2015).*

Bertolino et al, "Use Case-based Testing of Product Lines", ACM, pp. 355-358 (Year: 2003).*

Navarro et al, "A Proposal for Automatic Testing of GUIs Based on Annotated Use Cases", Hindawi Publishing Corporation, Advances in Software Engineering, pp. 1-9 (Year: 2010).*

Ecklund et al, "Change Cases: Use Cases that Identify Future Requirements" ACM, pp. 342-358 (Year: 1996).*

Hajri, "Supporting Change in Product Lines within the Context of Use Case-Driven Development and Testing", ACM, 1082-1084 (Year: 2016).*

Wang et al, "Multi-Objective Test Prioritization in Software Product Line Testing: An Industrial Case Study", ACM, 32-41 (Year: 2014).*

Khatri et al, "A Software Reuse Reference Model Approach in Developing an Automated Educational System for Patients Health Care Management", ACM, pp. 675-678 (Year: 2001).*

Reiss, "Towards Creating Test Cases Using Code Search", IEEE, pp. 436-440 (Year: 2014).*

* cited by examiner

SYSTEMS AND METHODS FOR TESTING ONLINE USE-CASE SCENARIOS IN A STAGING ENVIRONMENT

BACKGROUND

The present specification generally relates to testing of online use-case scenarios, and more specifically, to automatic configuration of a staging environment to facilitate online use-case testing according to various embodiments of the disclosure.

RELATED ART

Online service providers that provide online services (e.g., purchases of goods, payment transactions, etc.) to customers over a network may receive reports from customers indicating technical issues related to one or more use-case scenarios for using the online service functionalities provided by the online service providers. For example, a customer may report to an online service provider that a particular online feature cannot be activated or a particular workflow (e.g., adding a new bank account to the account) results in an error message. To resolve these technical issues, it is desirable for the online service provider to reproduce the same issue as reported by the customer in an offline environment (e.g., a staging environment). However, it is often not a simple task for the online service provider to reproduce the same issue.

For instance, the issue may arise only within a limited set of circumstances associated with the customer. As such, in order to reproduce the issue, the online service provider needs to configure a staging environment that is similar to the environment in which the customer experienced the issue. Manually configuring the staging environment is burdensome and prone to error, especially since there may be account configuration rules and restrictions imposed by the online service provider, of which the person who configures the staging environment may not be aware. Thus, there is a need for automatically configuring the staging environment based on specific use-case scenarios.

Figure 1:
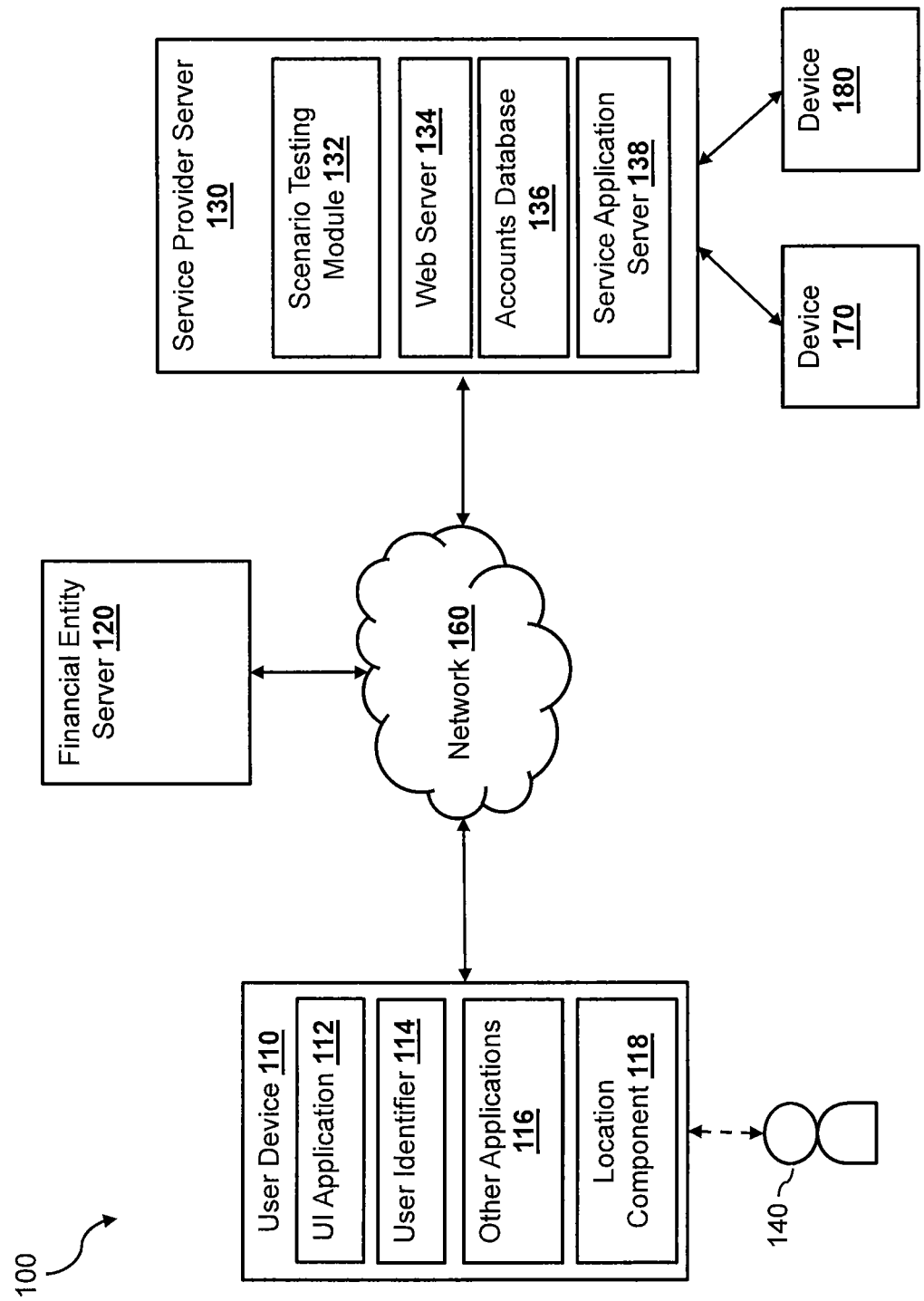
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for automatically configuring a staging environment to facilitate testing of online use-case scenarios for an online service provider. The online service provider may include an online environment (also referred to as a "live environment") for servicing users of the online service provider and an offline environment (also referred to as a "staging environment"). The online environment of the online service provider may include a first web server and a first service application server. The first web server and the first service application server may be communicatively coupled with user devices of the end-users (e.g., customers of the online service providers), for example, via a public network such as the Internet, such that the users may user their user devices to access the electronic services and functionalities provided by the online service provider. Consider an example in which the online service provider provides electronic payment services to end-users. An end-user may, via an interface (e.g., the web interface or the mobile application interface) of the online service provider, create a user account and may subsequently perform electronic payment transactions using the user account. In addition, the end-user may also, via the interface, link one or more financial sources (e.g., a bank account, a credit card, a debit card, etc.) with the user account, and may store a balance associated with the user account. The online environment may also include a first database that stores data associated with accounts and transactions related to the users. As users create new user accounts and perform electronic transactions via the user accounts, new data associated with the user accounts and transactions will be added to the first database.

The staging environment may also include a web server (e.g., a second web server) and a service application server (e.g., a second service application server) that are similar to the first web server and the first service application server of the online environment. As such, the online service provider may perform, in the staging environment, the same functionalities that it provides in the online environment. Unlike the online environment, the second web server and the second service application server of the staging environment are not communicatively coupled to the user devices of the end-users. Instead, the second web server and the second service application may be communicatively coupled to an internal network (e.g., a local area network) associated with the online service provider such that only devices (e.g., internal devices) connected to the internal network may access the services and functionalities provided by the second web server and the second service application server. The staging environment may also include a second database for storing data associated with fictitious accounts and transactions. In some embodiments, the online service provider may use the staging environment for testing purposes. For example, the online service provider may push newly developed software code associated with a new functionality or an update to an existing functionality to the staging environment for testing and/or debugging before the newly developed software code is incorporated into the online environment. In another example, when a defect (e.g., a software bug) that occurred in the online environment is reported (e.g., reported by a customer), the online service provider may try to reproduce (e.g., replicate) the defect in the staging environment in order to determine a software fix to the defect.

As discussed above, the reported defect may arise only within a limited set of circumstances associated with the customer who experienced it. As such, in order to replicate the issue, the online service provider needs to configure the staging environment according to the circumstances of the customer when the customer experienced the defect. In some embodiments, configuring the staging environment comprises generating fictitious account data for the staging environment such that a fictitious user account may be created in the staging environment having similar attributes as the user account of the customer in the online environment. For example, the fictitious user account may be manually created using the interface (e.g., the web interface, the mobile application interface) provided by the online service provider.

However, going through the interface provided by the online service provider to create the user account may be time consuming and prone to error. For example, a simple user account configuration that involves a user account that is linked to a single financial source (e.g., a bank) may include a set of user account attributes associated with a user account (e.g., a name, contact information, country of residence, demographics, age, etc.), a set of financial source attributes associated with a financial source (e.g., a bank name, a bank type, a currency type, a country of residence for the bank, a bank account number, a balance, transaction history information, etc.), and a link between the user account and the financial source. A human tester (e.g., an employee) who is responsible for creating the user account may have to go through a first workflow through the interface of the online service provider to generate a user account based on the set of user account attributes (e.g., manually entering the set of attributes), go through a second workflow through the interface of the online service provider to generate a bank account based on the set of bank account attributes, and go through a third workflow through the interface to link the user account with the bank account. Furthermore, since various rules and restrictions may be associated with the functionalities provided by the online service provider, the user account data and/or the bank account data generated by the human tester may not be in compliance with all of the rules and restrictions, possibly because the human tester may not be completely aware of all of the rules and restrictions.

In some embodiments, at least some of the rules and restrictions may be location or jurisdiction-based. For example, the rules and restrictions may limit a currency type used by a user account based on a jurisdiction in which the user resides. Furthermore, the rules and restrictions may restrict one or more functionalities from being initiated by a user based on a jurisdiction in which the user resides. As such, a user account associated with a user residing in a particular jurisdiction linking a bank account with a currency that corresponds to the particular jurisdiction may be an allowable use-case scenario for the online service provider, while the same user account linking another bank account with a different currency may not be an allowable use-case scenario. In some embodiments, the rules and restrictions are implemented within both of the live environment (e.g., online environment, the first web server, the first service application server, etc.) and the staging environment (e.g., offline environment, the second web server, the second service application server, etc.) of the online service provider, such that the interface may restrict the user from continuing to perform the functionalities (e.g., reporting an error message) when it does not comply with the rules and regulations.

Alternatively, the human tester may configure the staging environment by directly inserting the user account data and the bank account data into the second database. With the assistance of pre-generated scripts (e.g., stand-alone software instructions for performing a specific task), the human tester may configure the staging environment faster than going through the interface. However, directly modifying the second database and/or running scripts may require advanced technical knowledge and experience from the human tester. Furthermore, since directly modifying the second database may bypass the rules and restrictions implemented within the interface, the human tester may potentially "break" the staging environment by providing data that is not in compliance with the rules and restrictions of the online service provider, thereby defeating the purpose of the testing.

Thus, according to various embodiments of the disclosure, a testing tool that automatically configures the staging environment for testing online use-case scenarios may be provided. The testing tool may determine multiple user account configurations for using the online functionalities provided by the online service provider. In some embodiments, the user account configurations are determined based on the pre-existing rules and restrictions imposed by the online service provider such that all of the determined user account configurations comply with the pre-existing rules and restrictions. An example user account configuration may include a user who resides in South Africa having a user account that is linked to a single bank but has no account balance. Another example user account configuration may include a user who resides in Germany having a user account that is linked to a bank and a credit card, and has a positive account balance. Yet another example user account configuration may include a user who resides in the United States having a user account that is linked to a credit card and a debit card, and has a negative account balance. Other variations of user account configurations that comply with the pre-existed rules and restrictions may also be determined and stored.

In some embodiments, the testing tool may provide a testing interface that enables the human tester to configure the staging environment based on one of the pre-determined user account configurations. In one example, the testing interface may be implemented within a web browser plug-in, and may be activated via a user interface element of a web browser. In another example, the testing interface may be a web interface provided by the second web server of the online service provider.

Once activated, the testing interface may be presented on a device. The testing interface may include an interface element (e.g., a drop-down menu, etc.) that enables the human tester to select one of the pre-determined user account configurations to configure the staging environment. The human tester may browse the various pre-determined user account configurations to select a particular user account configuration for testing a use-case scenario in the staging environment. When a selection of the particular user account configuration is received via the testing interface, a set of account configuration data is generated. The set of account configuration data may include a set of user account attributes (e.g., a name, contact information, country of residence, demographics, age, etc.). The set of user account attributes may include attributes that are derived based on the selected user account configuration and fictitious attributes that are pre-determined to be in compliance with the rules and restrictions. For example, when the particular user account configuration includes a user who resides in Germany having a user account that is linked to a bank and a credit card, and has a positive account balance, user account attributes, such as Germany as the country of residence, German as a citizenship, and an account balance of $500 may be derived from the configuration. In addition, other fictitious attributes such as a user name, a password, male as the gender, 25 years old as the age, etc. may be added to the set of account attributes to populate the required information for setting up a new user account.

In the example given above, since the particular user account configuration includes a user account that is linked to multiple financial sources, the set of account configuration data may also include a set of bank attributes (e.g., a bank name, a bank type, a currency type, a country of residence for the bank, a bank account number, a balance, transaction history information, etc.) associated with a bank and a set of credit card attributes (e.g., issuing bank, a credit card number, a credit limit, an expiration date, a security code, etc.) for a credit card. Similar to the user account attributes, the bank account attributes and the credit card attributes are generated for the user account to be in compliance with the rules and restrictions. The set of account configuration data may also include data that links the user account to the bank and the credit card.

The set of account configuration data may be inserted into the second database of the staging environment accordingly such that the user account corresponding to the particular user account configuration is added in the staging environment. In some embodiments, once the set of account configuration data is inserted into the second database, the login credentials (e.g., the user name, the password, etc.) associated with the newly generated user account may be presented on the testing interface. In some embodiments, the testing tool may automatically redirect the web browser to a login page of the online service provider so that the human tester may use the login credentials presented in the testing interface to log in to the user account in the staging environment for testing the use-case scenario.

In some embodiments, the testing tool may automatically log the device of the human tester in to the user account based on the login credentials such that a homepage of the user account is presented on the web browser of the device. In some embodiments, in response to receiving the selection of the user account configuration, the staging environment may also be cleaned automatically before inserting the new user account data for creating the new user account. For example, all existing user account data in the second database may be removed (e.g., deleted) to ensure that no existing account data may interfere with the testing. Furthermore, the staging environment may also be locked during the testing so that other human testers may not create new accounts in the staging environment while the testing is being performed.

As discussed above, the defect experienced by the customer may arise only within a limited set of circumstances. Some defects may only be experienced when the functionalities are performed via a mobile device (e.g., using a mobile application or a mobile web browser). As such, the testing tool may facilitate testing using a mobile device by presenting on the testing interface a machine-readable code (e.g., a bar code, a QR code, biometric, etc.) representing the user credentials associated with the user account created in the staging environment. The human tester may then use a mobile application (e.g., the mobile application associated with the online service provider) to capture an image of the code. In response to receiving the image of the code from the mobile application, the user credentials associated with the user account may be derived from the code, and the device may automatically be logged in to the user account based on the user credentials.

Once the human tester logs in to the user account (either via the web browser or the mobile application), the human tester may begin performing one or more actions associated with functionalities provided by the online service provider in an attempt to replicate the defect experienced by the customer. For example, the human tester may perform an action to access functionality provided by the online service provider (e.g., linking a new financial source to the user account, performing an electronic payment transaction, confirming a bank, etc.) through a workflow (e.g., a series of actions such as clicking through a series of pages on the interface of the online service provider) of the online service provider. By performing each step (e.g., action) according to the workflow, the human tester may observe any defect (e.g., a broken link, an error message, etc.) produced in the staging environment.

In some embodiments, instead of having the human tester manually going through the workflow (e.g., manually clicking through the series of pages on the interface), the testing tool may automatically perform the testing by automatically generating and submitting calls (e.g., HTML request, API function calls, etc.) to the staging environment and detecting any errors produced by the staging environment in response to the calls. For example, the testing tool may determine multiple use-case scenarios corresponding to the different functionalities and based on the different user account configurations. The testing tool may present the use-case scenarios on the testing interface for the human tester to select. An example use-case scenario may include a user (who resides in Germany having a user account that is linked to a bank and a credit card, and has a positive account balance) linking a new bank to the user account. Another example use-case scenario may include a user (who resides in South Africa having a user account that is linked to a single bank but no account balance) linking a new credit card to the user account. The different use-case scenarios may be presented on the testing interface that enables the human tester to select a particular use-case scenario.

Upon receiving a selection of a particular use-case scenario, the testing tool may derive a particular user account configuration based on the use-case scenario. A set of user account configuration data may be generated in the same manner as discussed herein, and inserted into the second database of the staging environment. The testing tool may then cause the web browser (or the mobile application) to log in to the newly created user account and to perform the actions for the functionality corresponding to the use-case scenario based on the user account. For example, the testing tool may cause the web browser (or the mobile application) to send calls to the second web server and/or the second service application server to simulate the human tester performing the actions (e.g., clicking through the pages, inserting data, etc.). As the testing tool causes the web browser to perform through the series of step in the workflow, the testing tool may observe the response pages received from the web server and/or the service application server to detect if any defect is present (e.g., any broken link, any error message page, any unexpected page, etc.). The detected defect may then be reported to the human tester.

In some embodiments, instead of enabling the human tester to select a particular user account configuration and/or a particular use-case scenario, the user account of the customer who reported the defect in the online environment may be accessed. The testing tool may analyze the user account of the customer to determine a set of user account attributes. The testing tool may then use the set of account attributes to create the new user account in the staging environment. The defect reported by the customer (and/or the recent online activities of the customer) may also be analyzed to determine a functionality (or a workflow) that the customer was performing when the defect was observed. The functionality and the set of account attributes may then be used together to generate the particular use-case scenario for testing in the staging environment. Once the user account configuration and the use-case scenario is determined, the testing tool may then create a new user account in the staging environment and perform the testing via the web browser or the mobile application. Any defect observed by the testing tool during the testing may then be reported to the human tester. This way, the defect may be replicated in the staging environment automatically without requiring the human tester to have any technical knowledge or to provide any input.

FIG. 1 illustrates an electronic transaction system 100 within which the testing tool may be implemented according to one embodiment of the disclosure. The electronic transaction system 100 includes a service provider server 130 associated with an online service provider, a user device 110 associated with an end-user (e.g., customer) 140 of the online service provider, a financial entity server 120 that may be communicatively coupled with each other via a network 160. The service provider server 130 may be communicatively coupled with devices 170 and 180 directly or via an internal network associated with the online service provider. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by the end-user 140 to interact with the service provider server 130 and/or other user devices similar to the user device 110 over the network 160. For example, the end-user 140 may use the user device 110 to log in to a user account with the service provider to access account services or conduct electronic transactions (e.g., account transfers or payments, purchase goods and/or services, sales of goods and/or services, receive payments of the sale, adding a new financial source, etc.) with the service provider server 130. Furthermore, the end-user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the end-user 140 to conduct electronic transactions (e.g., selling, shopping, purchasing, electronic payments, etc.) with the service provider server 130 over the network 160. In one aspect, purchase expenses may be directly and/or automatically debited from the user account related to the end-user 140 via the user interface application 112. Similarly, sales receipts may be directly and/or automatically credited to the user account associated with the end-user 140.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the end-user 140. For example, the applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the end-user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the end-user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. For example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The financial entity server 120, in various embodiments, may be maintained by a financial entity (e.g., a bank), which maintain financial accounts (e.g., a checking account, a credit card account, a debit card account, etc.) for various users, including the end-user 140. In some embodiments, the online service provider may use the service provider server to communicate with the financial entity server 120, for example, to verify a bank account of a customer, to withdraw funds from (or deposit funds to) a bank account of the customer, etc. Even though only one financial entity server 120 is shown in FIG. 1, it has been contemplated that one or more financial entity servers (each similar to merchant server 120) may be communicatively coupled with the service provider server 130 and the user device 110 via the network 160 in the system 100.

The service provider server 130, in one embodiment, may be maintained by an online service provider, which may provide online services (e.g., selling of merchandise processing, purchasing of merchandise, performing electronic transactions, etc.). As such, the service provider server 130 may include a web server 134 and a service application server 138, which may be adapted to interact with the user devices (such as the user device 110) over the network 160 to facilitate the searching, selection, purchase, payment of items, and/or other online services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

The web server 134 may be configured to interact with a web browser of a user device (e.g., the user device 110) by serving web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

The service application server 138 may be configured to interact with an application (e.g., a mobile application) executed on a user device (e.g., the user device 110). In some embodiments, the service application server 138 may interact with the application on the user device 110 to provide an interface to interact with the end-user 140. For example, the application may provide a log-in page interface that is similar to the log-in page provided by the web server. The application may also provide other page interfaces associated with the different services offered by the service provider server 130. As a result, a user may access a user account associated with the user and access various services offered by the service provider server 130, by interacting with the service application server 138 via the application running on the user device.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130. In some embodiments, the web server 134, the service application server 138, and the account database 136 together form an online environment within which the online service provider offers online services to end-users.

Figure 2:
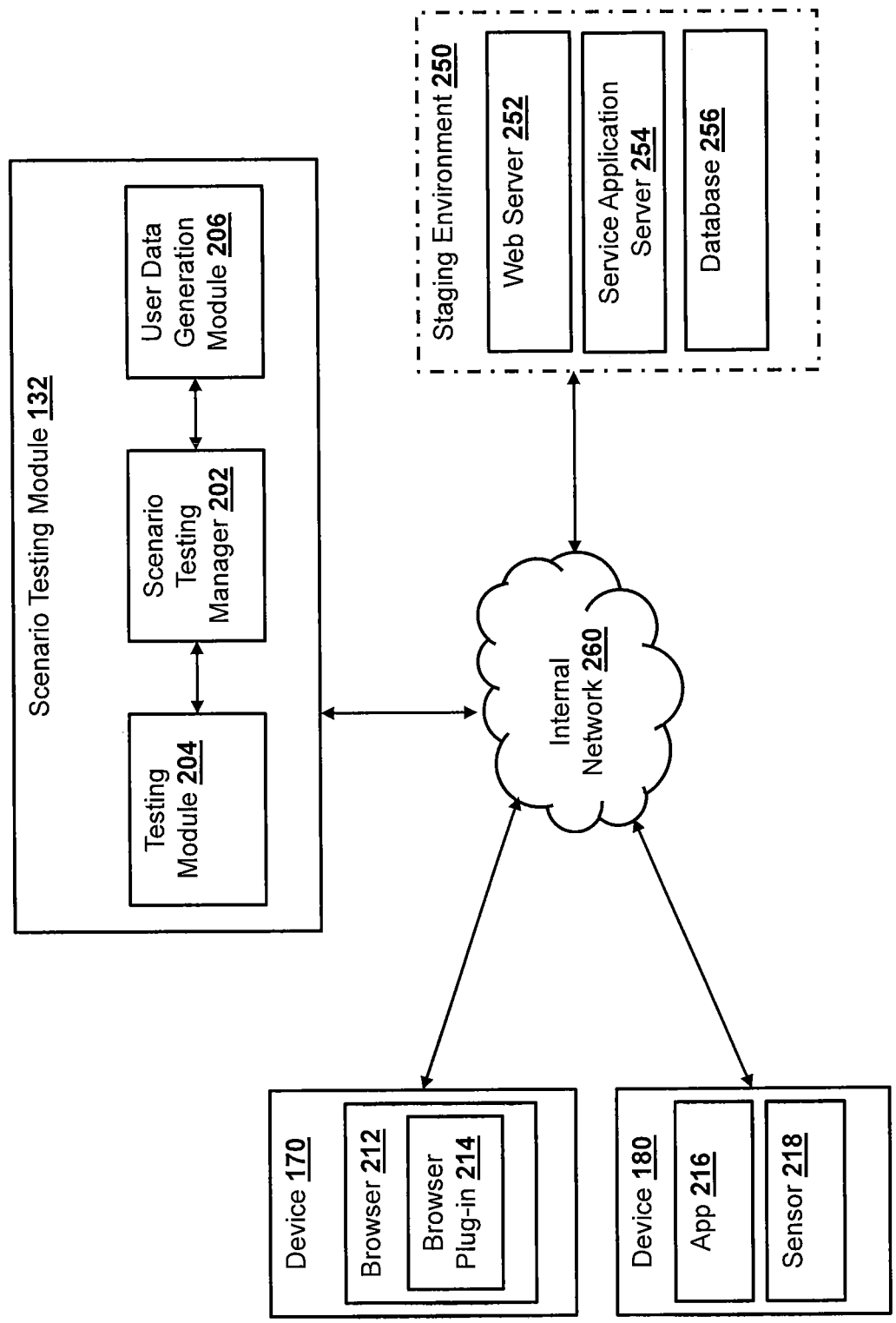
FIG. 2 is a block diagram illustrating a scenario testing module according to an embodiment of the present disclosure.

The service provider server 130 may also include a scenario testing module 132 that implements the functionalities of the testing tool as disclosed herein. In some embodiments, the scenario testing module 132 provides a testing interface on the device 170 and/or the device 180 to facilitate testing of one or more use-case scenarios in a staging environment. FIG. 2 illustrates a block diagram of the scenario testing module 132. As shown in FIG. 2, the scenario testing module 132 includes a scenario testing manager 202, a testing module 204 for perform automated testing of one or more use-case scenarios, and a user data generation module 206 for generating fictitious account data based on a use-case scenario. In some embodiments, the scenario testing module 132 is communicatively coupled with devices 170 and 180 over an internal network 260 associated with the online service provider. The devices 170 and/or 180 may be used by a human tester associated with the online service provider to perform testing of various use-case scenarios in a staging environment 250. The device 170 may include a web browser 212 and a browser plug-in 214. The device 180 may be a mobile device, and may include a mobile application 216. The device 180 may also include a sensor 218 (e.g., an image sensor) for capturing an image of a machine-readable code to log in to a newly generated user account in the staging environment 250. The scenario testing module 132 is also communicatively coupled, via the internal network 260, with a web server 252, a service application server 254, and a database 256, which collectively form the staging environment 250. In some embodiments, the web server 252, the service application server 254, and the database 256 may be similar to, and may be configured to perform similar functionalities as, the web server 134, the service application server 138, and the accounts database 136, respectively. However, unlike the web server 134 and the service application server 138, the web server 252 and the service application server 254 are not communicatively coupled with devices of end-users such as the device 110. Instead, the web server 252 and the service application server 254 are communicatively coupled with the internal network 260 associated with the online service provider and are accessible only by devices connected to the internal network 260, such as the devices 170 and 180.

Figure 3:
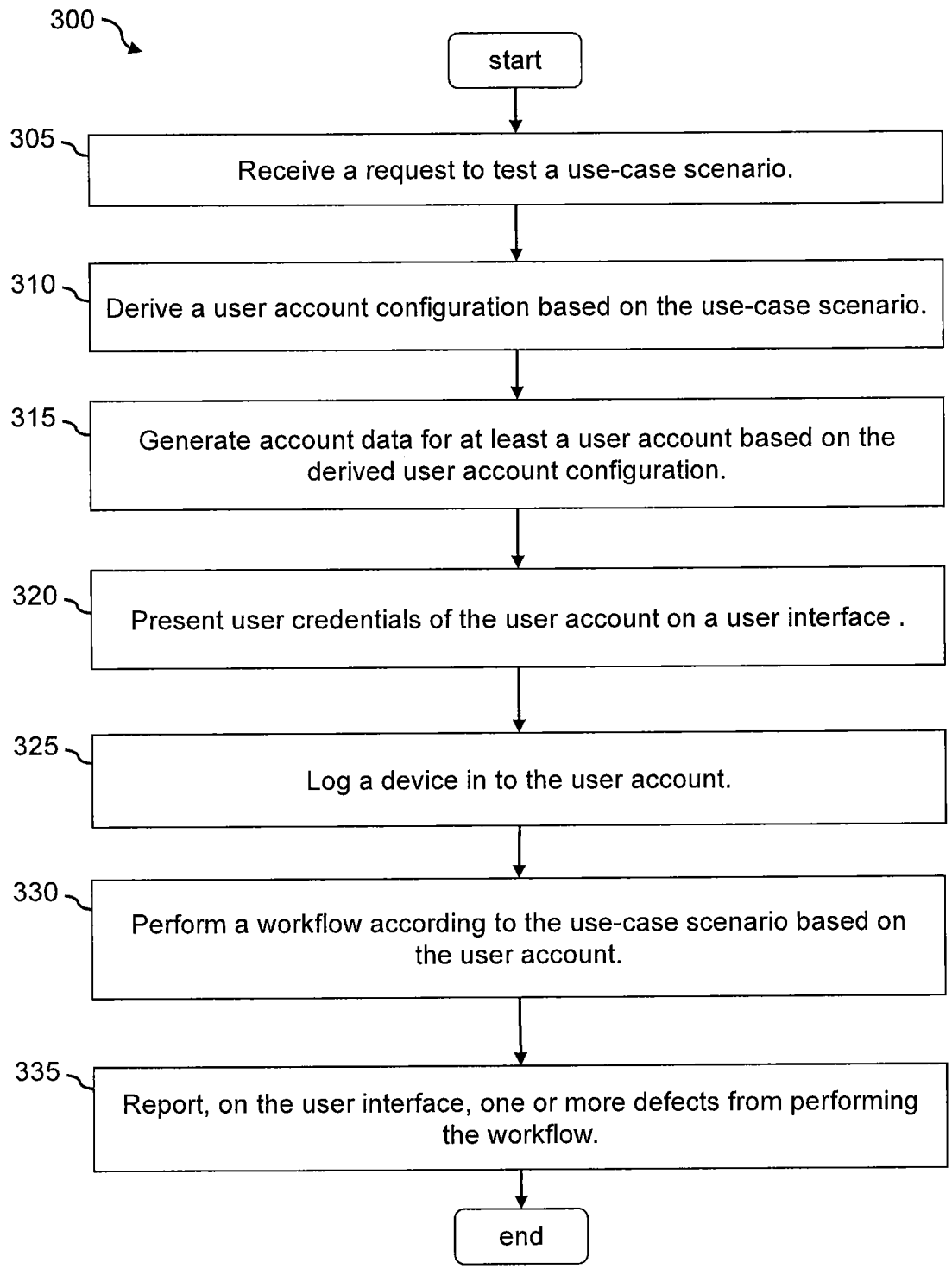
FIG. 3 is a flowchart showing a process of facilitating a testing of online use-case scenarios according to an embodiment of the present disclosure.

FIG. 3 illustrates a process 300 for facilitating testing of use-case scenarios according to various embodiments of the disclosure. In some embodiments, the process 300 may be performed by the scenario testing module 132. The process 300 begins by receiving (at step 305) a request to test a use-case scenario. For example, the scenario testing module 132 may receive a request to test a use-case scenario from the device 170 and/or the device 180. In some embodiments, the scenario testing module 132 may provide an interface on the device 170 and/or the device 180 for initiating a request to test a use-case scenario. For example, the scenario testing module 132 may provide a web interface presentable on the web browser 212 to initiate the request, or an application interface presentable on the mobile application 216 to initiate the request. In another example, the scenario testing module 132 may provide a browser plug-in 214 that may be installed on the web browser 212 for initiating such a request. The browser plug-in 214 may include software instructions that can be incorporated into a web browser, such as the web browser 212. The browser plug-in may execute the software instructions when activated by the web browser 212.

Figure 4:
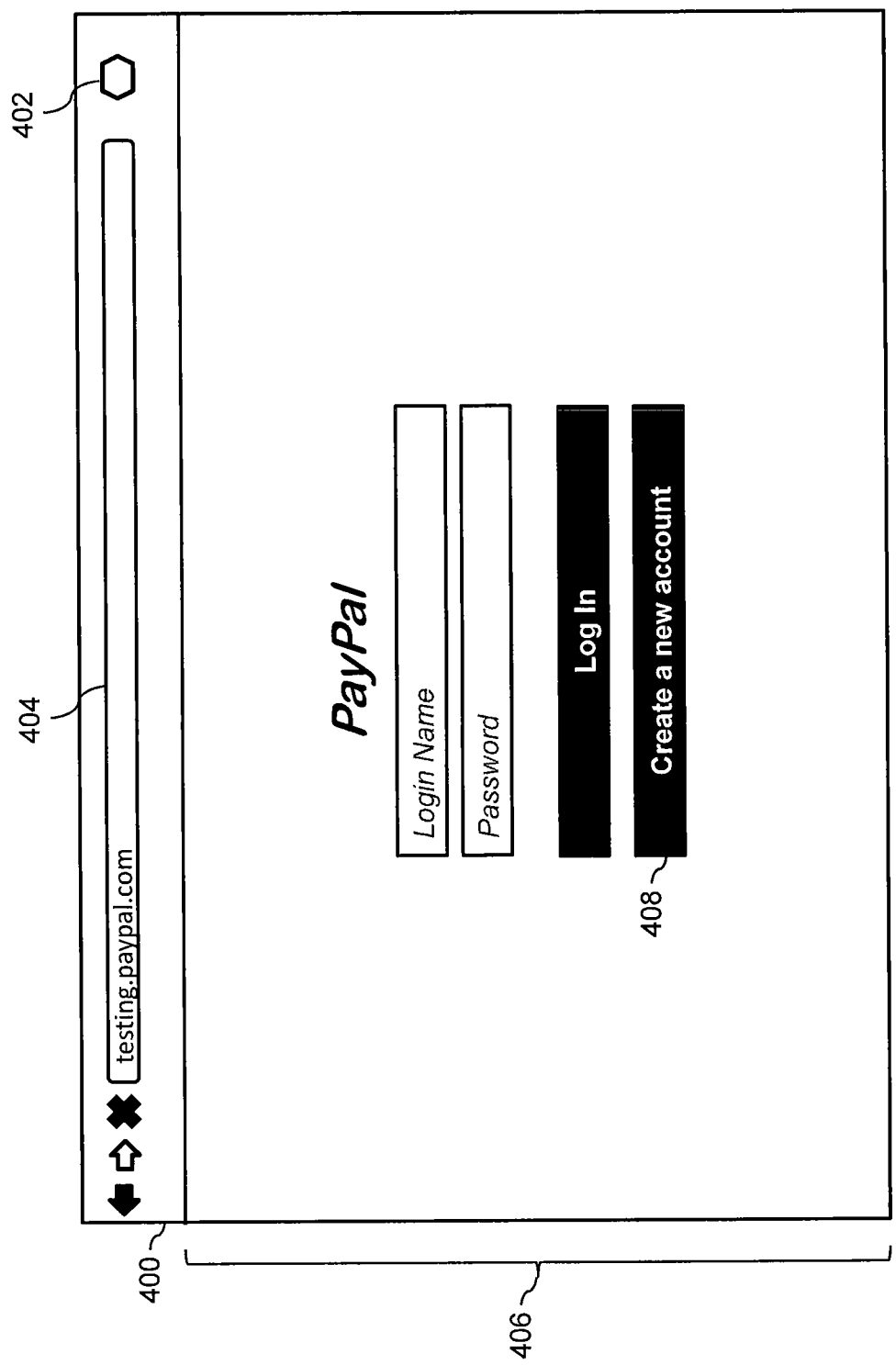
FIG. 4 illustrates a browser interface of a browser including a browser plug-in according to an embodiment of the present disclosure.

FIG. 4 illustrates a browser interface 400 associated with the web browser 212 that incorporates the browser plug-in 214. As shown, the browser interface 200 includes a webpage address input area 404 that allows a user to provide a webpage address and a webpage presentation area 406 for presenting content of a webpage. In this example, the browser interface 400 presents the content of a log-in page of the online service provider within the staging environment 250, as indicated by the web address "testing.paypal.com" shown in the webpage address input area 404. A human tester may use the browser interface to log into an existing user account in the staging environment 250 and perform one or more functionality tests based on the user account. In addition, the human tester may select the link 408 to manually create a new user account in the staging environment 250 through the creating user account workflow provided by the web server 252. However, as discussed above, manually creating a new user account for a specific user account configuration can be time consuming and prone to error.

Figure 5:
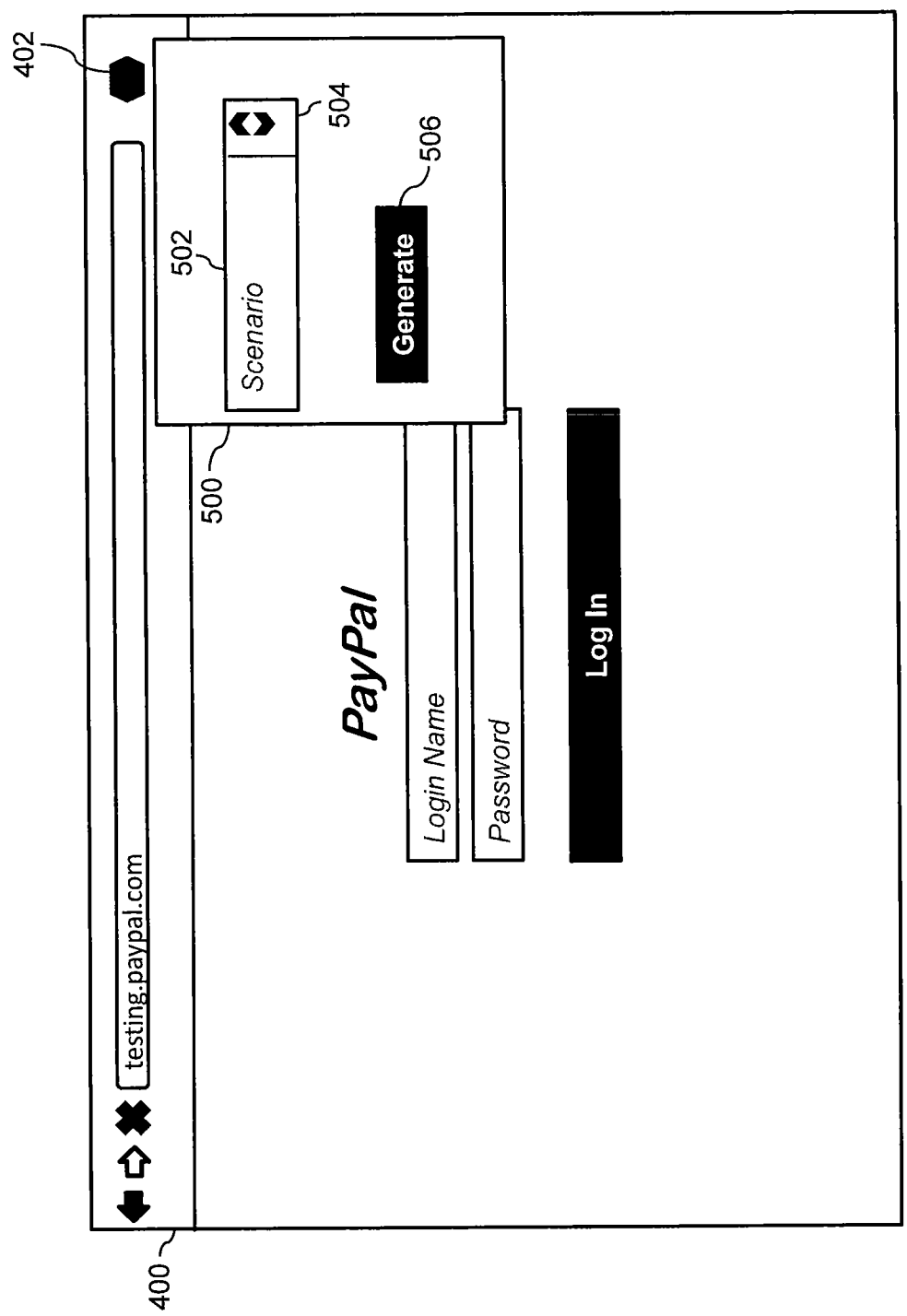
FIG. 5 illustrates a browser interface when a browser plug-in is activated according to an embodiment of the present disclosure.

The browser interface 400 also includes an interface element 402 for activating the browser plug-in 214 for initiating a request to test a use-case scenario. FIG. 5 illustrates the browser interface 400 after the browser plug-in 214 is activated (e.g., by selecting the interface element 402). As shown, after the browser plug-in 214 is activated, a plug-in interface 500 is presented on the browser interface 400. Although the interface 500 is described as a plug-in interface presented by a browser plug-in herein, it is understood that the interface 500 (also referred as the "testing interface") may be implemented in other forms, such as a web interface provided by a webpage and an application interface provided by an application (e.g., the mobile application 216). In some embodiments, the plug-in interface 500 is superimposed onto the browser interface 400. In some embodiments, the plug-in interface 500 may present different user account configurations for selection by the human tester. For example, the plug-in interface 500 may present the different user account configurations in a drop-down menu 502.

As discussed herein, the scenario testing module 132 may determine multiple user account configurations based on pre-existing rules and restrictions imposed by the online service provider. An example restriction may specify that a user who resides in Germany may only use Euros as the transaction currency. Another example restriction may specify that a user who resides in South African may link to a bank account of a local bank. In some embodiments, the scenario testing module 132 may determine the user account configurations by generating user account configuration candidates through various combinations of user account attributes and eliminating user account configuration candidates that do not comply with the pre-existing rules and restrictions. An example user account configuration may include a user who resides in South Africa having a user account that is linked to a single bank but no account balance. Another example user account configuration may include a user who resides in Germany having a user account that is linked to a bank and a credit card, and has a positive account balance. Yet another example user account configuration may include a user who resides in the United States having a user account that is linked to a credit card and a debit card, and a negative account balance. Other variations of user account configurations that comply with the pre-existed rules and restrictions may also be determined and stored.

In some embodiments, instead of determining and presenting user account configurations on the plug-in interface 500, the scenario testing module 132 may determine and present, on the plug-in interface 500, multiple use-case scenarios that comply with the pre-existed rules and restrictions. As used herein, a use-case scenario represents performing a particular functionality provided by the online service provider (e.g., perform an electronic payment transaction, linking a bank to the user account, confirming a bank, etc.) using a particular user account configuration. An example use-case scenario may include a user (who resides in Germany having a user account that is linked to a bank and a credit card, and has a positive account balance) linking a new bank to the user account. Another example use-case scenario may include a user (who resides in South Africa having a user account that is linked to a single bank but no account balance) performing an electronic payment transaction. The different use-case scenarios may be presented on the plug-in interface 500 (e.g., on the dropdown menu 502) that enables the human tester to select a particular use-case scenario.

For example, the human tester may select the dropdown button 504 to expand the list of user account configurations and/or the list of use-case scenarios for selection. Referring back to FIG. 3, the process 300 then derives (at step 310) a user account configuration based on the use-case scenario and generates (at step 315) user account configuration data based on the user account configuration. For example, upon receiving a selection of a particular user account configuration and/or a use-case scenario from the human tester via the plug-in interface 500, the browser plug-in 214 may transmit the selection to the scenario testing module 132. The scenario testing module 132 may then derive a user account configuration based on the selection.

When the selection indicates a particular user account configuration, the scenario testing manager 202 may use the user data generation module 206 to generate the user account configuration data based on the selected user account configuration. However, when the selection indicates a particular use-case scenario, the scenario testing manager 202 may first derive a particular user account configuration based on the selected use-case scenario, and then use the use data generation module 206 to generate the user account configuration data based on the derived user account configuration. As discussed above, each use-case scenario involves performing a particular functionality provided by the service provider server 130 based on a user account having a particular account configuration. As such, the scenario testing manager 202 of some embodiments may extract the user account configuration from the use-case scenario and use the user data generation module 206 to generate the user account configuration data based on the extracted user account configuration.

As discussed above, the request to initiate a test on a use-case scenario may be triggered from a defect experienced and reported by an end-user (e.g., a customer) of the online service provider. As such, in some embodiments, instead of enabling the human tester to select a particular use-case scenario or a particular user account configuration, the plug-in interface 500 may include an input area (e.g., an input field) that enables the human tester to provide an account identifier (e.g., a user name, an account number, etc.) of a user account of the customer in the online environment. In response to receiving the account identifier, the scenario testing manager 202 may access the online environment (e.g., the accounts database 136) to obtain account data associated with the user account of the customer in the online environment. For example, the scenario testing manager 202 may obtain, from the accounts database 136, information about the customer (e.g., a country of residence, a citizenship, a name, a gender, an age), information about the user account (e.g., a balance, a currency type, transaction history, etc.), and information about one or more financial sources that are linked to the user account (e.g., bank/card number, a name of the bank/issuing bank, a country where the issuing bank resides, transfer history, etc.). The scenario testing manager 202 may then derive a particular user account configuration based on the information obtained from the accounts database 136.

In one example, based on an account identifier (e.g., provided by the human tester via the plug-in interface 500), the scenario testing manager 202 may obtain account information associated with the account identifier from the account database 136, and may determine that the customer is a German residing in Germany, the user account of the customer has a balance of $1,740 and is linked to a credit card issued by a German bank. As such, the scenario testing manager 202 may derive a user account configuration based on the information obtained from the account database 136. The derived user account configuration may include a user who resides in Germany having a user account that is linked to a credit card, and has a positive account balance. The derived user account configuration may not include all of the information associated with the user account, and may also generalize some of the information of the customer. For example, the derived user account configuration may not indicate the actual name of the customer. Furthermore, instead of indicating the actual account balance, the derived user account configuration may only indicate that the account has a positive (or negative) balance. This way, the user account created in the staging environment 250 will represent the characteristics of the user account of the customer in the online environment without divulging sensitive data of the customer.

In some embodiments, in addition to deriving a user account configuration, the scenario testing manager 202 may also derive a use-case scenario based on data obtained from the online environment. For example, the scenario testing manager 202 may access the web server 134 and/or the service application server 138 to determine recent online activities of the customer. For example, if it is indicated, from activity logs maintained by the web server 134 and/or the service application server 138, that the customer has recently started an online workflow to link a new bank account to the user account of the customer but did not complete, the scenario testing manager 202 may determine that the defect experienced by the customer arises from the use-case scenario of linking a new bank account to the user account based on the user account of the customer.

The user data generation module 206 may then generate user account configuration data based on the derived user account configuration. In some embodiments, the user account configuration data may include a set of user account attributes (e.g., a name, contact information, country of residence, demographics, age, etc.). The set of user account attributes may include attributes that are derived based on the selected user account configuration and fictitious attributes that are pre-determined to be in compliance with the rules and restrictions. For example, when the particular user account configuration includes a user who resides in Germany having a user account that is linked to a credit card, and has a positive account balance, the user data generation module 206 may generate user account attributes, such as Germany as the country of residence, German as a citizenship, and an account balance of $500. In addition, the user data generation module 206 may generate other fictitious user account attributes such as a user name, a password, male as the gender, 25 years old as the age, Euros as the currency, etc. to populate the required information for setting up a new user account.

In the example given above, since the particular user account configuration includes a user account that is linked to a credit card, the user account configuration data may also be generated to include a set of credit card attributes (e.g., issuing bank, a credit card number, a credit limit, an expiration date, a security code, etc.) for a credit card. In some embodiments, the user data generation module 206 generates the user account configuration data to retain the characteristics of the user account of the customer without divulging any sensitive data (e.g., the actual current account balance, the actual credit card number, etc.) of the customer. In addition, the user data generation module 206 generates the user account configuration data that complies with the pre-existed rules and restrictions of the online service provider without any data input from the human tester.

The scenario testing manager 202 may then insert the generated user account configuration data into the database 256 to create a new user account and a new credit card object in the staging environment 250. For example, the scenario testing manager 202 may submit one or more database functions (e.g., SQL calls) to insert the user account configuration data into the database 256 to create the user account and the credit card object, and creating a link between the user account and the credit card object. In some embodiments, prior to inserting the user account configuration data into the database 256 to create the new user account, the scenario testing manager 202 may clean the staging environment 250 to ensure that the testing performed in the staging environment 250 will not be interfered by pre-existing data. For example, the scenario testing manager 202 may remove (e.g., delete) all existing data associated with user account(s), bank account(s), credit card(s) from the database 256 (e.g., by calling one or more database function calls) before inserting the user account configuration data into the database 256. Furthermore, in order to avoid other users from using the staging environment during the time when the testing is performed, the scenario testing manager 202 may also lock the staging environment 250 during the testing. For example, the scenario testing manager 202 may set a lock flag in the database 256 such that no one user account (other than the new account that is created) can perform any activities (e.g., adding new data to or modifying data in the database 256) during the testing. The scenario testing manager 202 may unset the lock flag in the database 256 after the testing is completed.

Figure 6:
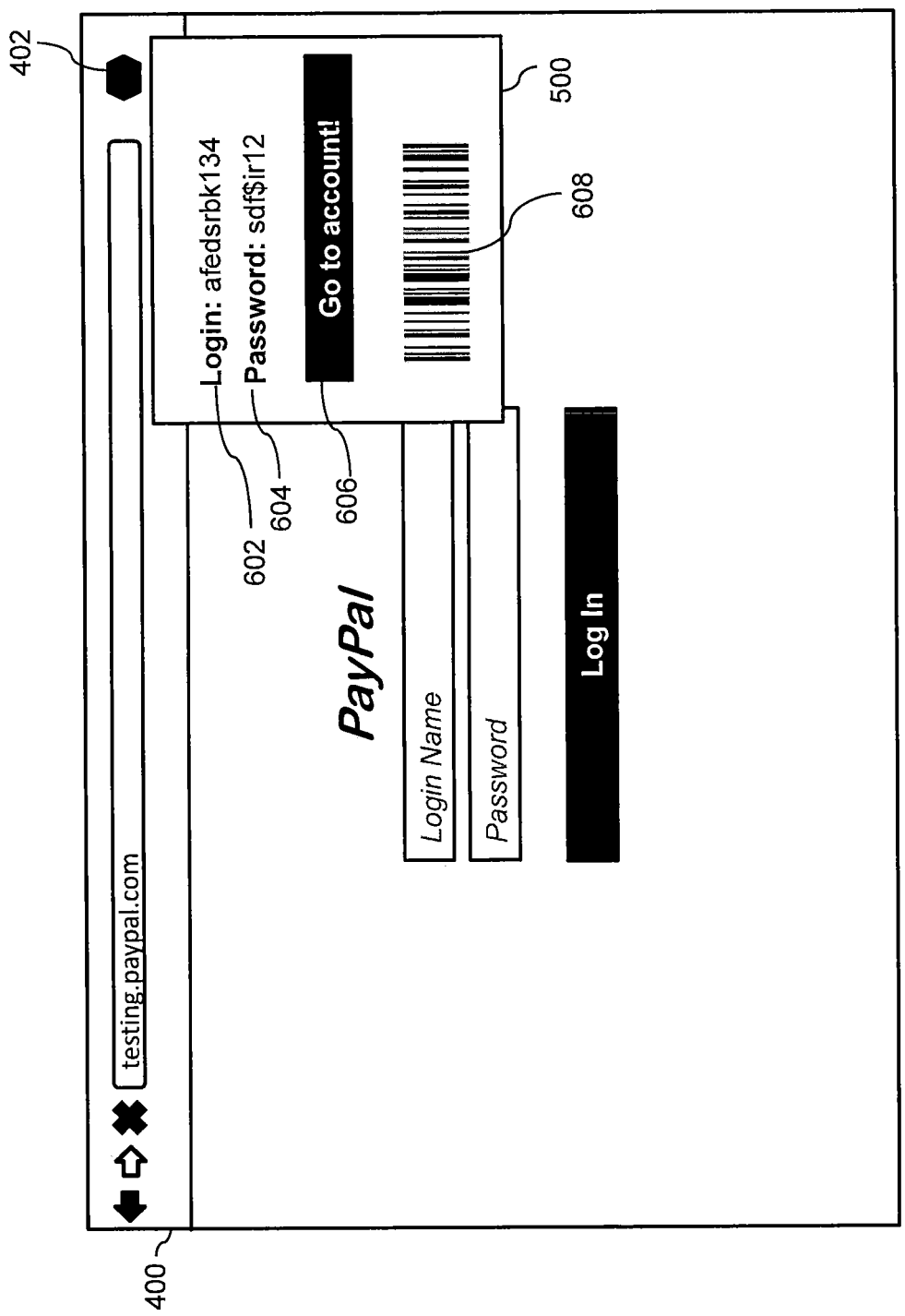
FIG. 6 illustrates a plug-in interface presenting user credentials of a user account according to an embodiment of the present disclosure.

Referring back to FIG. 3, after a user account is created in the staging environment, the process 300 presents (at step 320) user credentials of the user account on a user interface and logs (at step 325) a device in to the user account. For example, after inserting the user account configuration data into the database 256 to create the new user account and the new credit card object, the scenario testing manager 202 may transmit the user credentials (e.g., the user name and the password) of the user account to the browser plug-in 215 of the device 170 for presenting on the plug-in interface 500. FIG. 6 illustrates the plug-in interface 500 that presents the user credentials of the newly created user account in the staging environment 250. As shown in FIG. 6, the browser plug-in 214 presents on the interface 500 a login name 602 "afedsrbk134" and a password 604 "sdf$ir12" associated with the new user account created in the staging environment 250. The human tester may use the user credentials presented in the interface 500 to log in to the user account in the staging environment 250. For example, the human tester may use the web browser 212 of the device 170 to go to an account log in page (e.g., by typing the network address for the account log in page "testing.paypal.com" provided by the web server 252 in the webpage address input area 404 of the web browser 212), and type in the login name and password presented in the plug-in interface 500.

In some embodiments, the browser plug-in 214 may also present a button 606 for automatically logging the device 170 in to the newly created user account. For example, upon receiving a selection (e.g., by the human tester) of the button 606, the browser plug-in 214 may generate a request (e.g., an HTTP request) for logging in to the user account of the online service provider in the staging environment 250 based on the user credentials and transmit the request to the web server 252 and/or the service application server 254. The web server 252 and/or the service application server 254 may receive the request and authorize the device 170 to access the user account in the staging environment 250. For example, the web server 252 and/or the service application server 254 may respond to the request by transmitting a homepage of the user account to the device 170, such that the browser 212 may present to the human tester the homepage of the user account on the browser interface 400.

As discussed above, the defect experienced by the customer may arise only within a limited set of circumstances. Some defects may only be experienced when the functionalities are performed via a specific type of computing device, such as a mobile device (e.g., using a mobile application or a mobile web browser). As such, in order to facilitate testing the use-case scenario using a mobile device, the browser plug-in 214 of some embodiments may generate a machine-readable code (e.g., a bar code, a QR code, etc.) representing the user credentials associated with the user account created in the staging environment 250 and present the machine-readable code (e.g., the bar code 608) on the plug-in interface 500. The human tester may then use a mobile application (e.g., the device 180) to capture an image of the code. For example, the sensor 218 of the device 180 may capture an image of the bar code 208. In response to receiving the image of the bar code 208, the mobile application 216 may determine the user credentials from the bar code 208 and may automatically log in to the user account based on the user credentials. For example, after determining the user credentials (e.g., the login name and the password) of the account based on the image of the bar code 608, the mobile application 216 may transmit a request to log in to the user account based on the user credentials to the service application server 254. After verifying the user credentials, the service application server 254 may then log the device 180 in to the user account in the staging environment 250 and may present a homepage of the user account on the mobile application 216.

Figure 7:
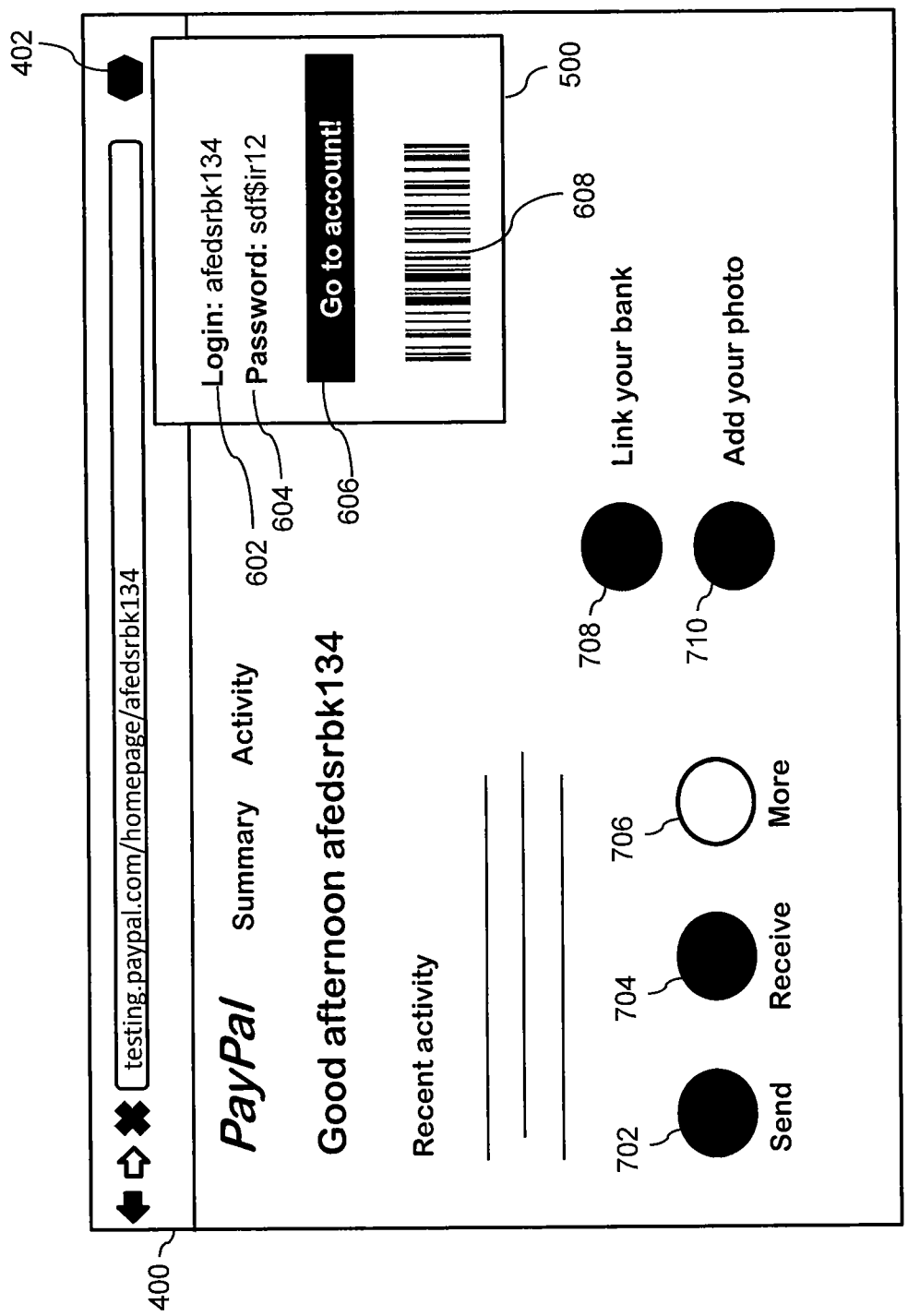
FIG. 7 illustrates a browser interface presenting a homepage of a user account according to an embodiment of the present disclosure.

FIG. 7 illustrates the browser interface 400 presenting the homepage of the user account "afedsrbk134" after the web server 252 and/or the service application server 254 logs the device 170 in to the user account. As shown, the homepage of the user account may include information of the user account, such as recent activity performed by the user account "afedsrbk134." The homepage may also include one or more interface elements, such as buttons 702-710, for initiating corresponding functionalities provided by the online service provider. For example, the button 702 is for performing a transmission of an electronic payment to another user account, the button 704 is for performing a request for an electronic payment from another user account, the button 706 is for performing other functions provided by the online service provider, the button 708 is for linking an additional financial source to the user account, and the button 710 is for adding a profile picture for the user account. Each functionality may be associated with a workflow (e.g., a series of webpages provided by the web server 252 and information submitted by the human tester through the webpages). For example, upon selecting the button 708, the web server 252 may transmit to the device 170 a first webpage that prompts the human tester to provide information such as a name of the bank and an account number. Upon receiving the bank name and the bank account number, the web server 252 may verify the bank information by providing a second webpage that prompts the human tester to provide private information of the bank account (e.g., an account balance, user credentials, etc.). The web server 252 may then verify the bank account information, add/modify data in the database 256 to create the link between the user account and the bank account, and present a third webpage that notifies the human tester that the bank account has been linked to the user account.

In some embodiments, the scenario testing module 132 may perform the testing automatically without requiring any input from the human tester. For example, the scenario testing module 132 may obtain a use-case scenario (e.g., a particular functionality to perform in addition to a user account configuration) for the testing. The scenario testing module 132 may obtain the use-case scenario by either receiving a selection of a particular use-case scenario provided by the human tester via the plug-in interface 500 or deriving the use-case scenario based on information obtained from the online environment (e.g., recent online activities of the customer). As such, the process 300 performs (at step 330) a workflow according to the use-case scenario based on the user account.

In some embodiments, the testing module 204 may work with the browser 212 of the device 170 and/or the mobile application 216 of the device 180 to perform the workflow according to the use-case scenario. For example, after logging the device 170 and/or the device 180 in to the user account, the testing module 204 may transmit a set of software instructions to the web browser 212 (e.g., through the browser plug-in 214) and/or the mobile application 216 to execute according to the workflow. In the example where the use-case scenario involves linking a new bank account to the user account, the software instructions may cause the browser 212 and/or the mobile application 216 to transmit a request to the web server 252 and/or the service application server 254 to initiate the "link your bank" functionality as if the button 708 is selected. The software instructions may then cause the browser 212 and/or the mobile application 216 to go through the pages associated with the "link your bank" workflow, submit the necessary information (e.g., a name of the bank, a bank account number, etc.) in the corresponding fields in the pages, and submitting the information to the web server 252 and/or the service application server 254, as if the information was submitted by the human tester via the pages. In some embodiments, the testing module 204 may determine a set of expected pages for each workflow. For example, for the "link your bank" workflow, the testing module 204 may determine that the "link your bank" workflow is associated with a series of pages (e.g., webpages), including a first page that prompts the human tester to provide information such as a name of the bank and an account number, a second webpage (after the user provide the bank name and the account number) that prompts the human tester to provide private information of the bank account (e.g., an account balance, user credentials, etc.), and a third webpage (after verifying the private information of the bank account) that notifies the human tester that the bank account has been linked to the user account. As such, the testing module 204 may monitor the pages received at the browser 212 and/or the mobile application 216 from the web server 252 and/or the service application server 254 and determine whether the pages received from the web server 252 and/or the service application server 254 match the expected pages after each step in the workflow. For example, the testing module 204 may determine whether the page received at the browser 212 and/or the mobile application 216 is different from the expected page or includes an error message. The testing module 204 may also determine whether all the input fields in the pages for submitting the information is functional.

At step 335, the process reports, on the user interface, one or more defects from performing the workflow. For example, the if any defect is observed by the testing module 204 during the performing of the workflow, the testing module 204 may report the defect(s), for example, on the plug-in interface 500 of the browser plug-in 214.

While various embodiments have been described within the context of electronic financial transactions and services, other contexts and services may also utilize aspects described herein for testing specific scenarios associated with defects experienced by users, including digital content providers and platforms, such as social networking platforms, that provide access to content associated with a user account with the digital content provider/platform.

Figure 8:
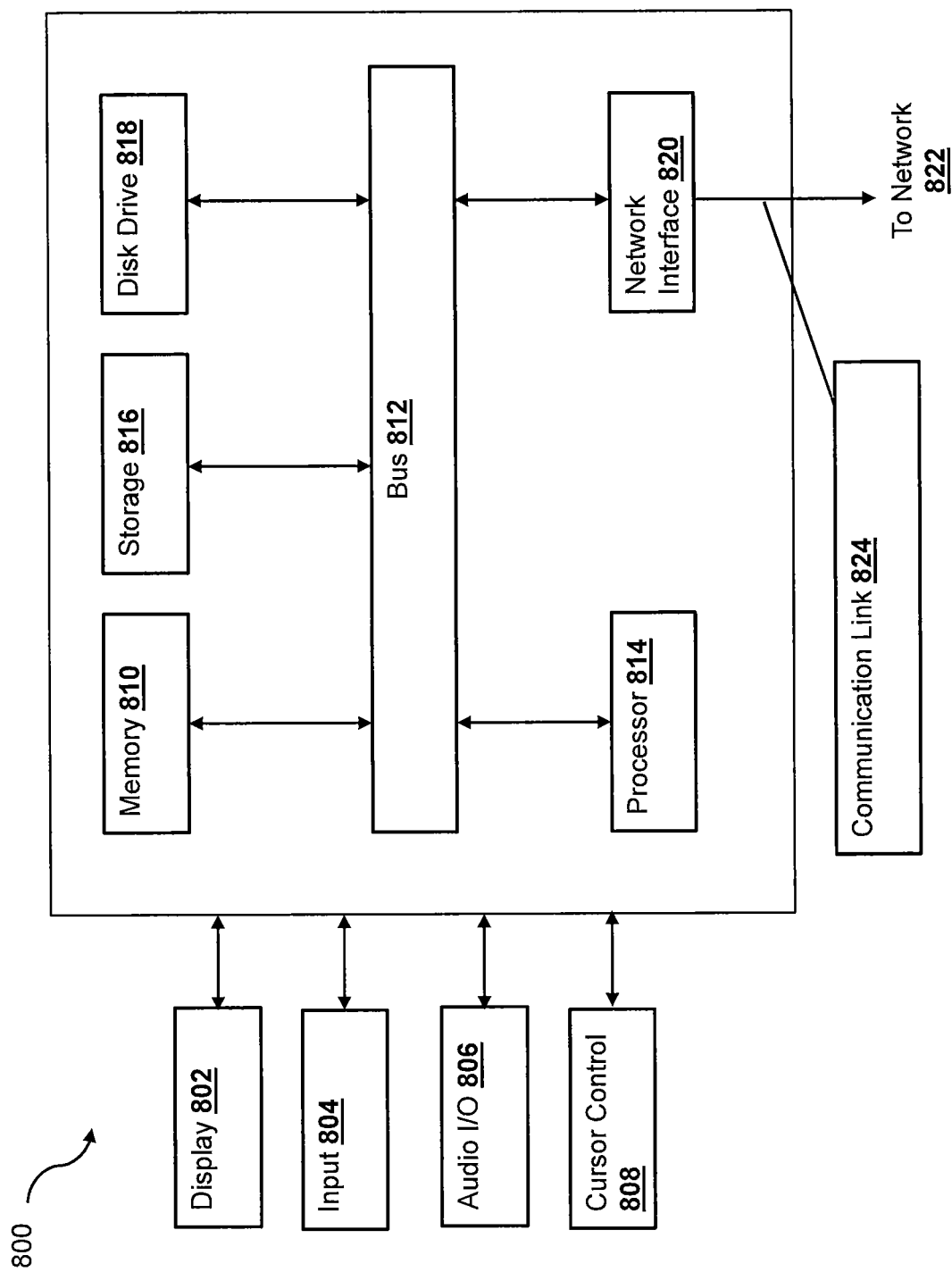
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the financial entity server 120, the user device 110, the device 170, and the device 180. In various implementations, the user device 110, the device 170, and/or the device 180 may include a mobile cellular phone, personal computer (PC), laptop, wearable computing device, etc. adapted for wireless communication, and the service provider server 130 may include a network computing device, such as a server. Thus, it should be appreciated that the devices 110, 120, 170, 180, and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account, a checkout page for purchasing an item from a merchant, or a chat interface for facilitating an online chat session. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid state drive, a hard drive). The computer system 800 performs specific operations by the processor 814 and other components by executing one or more sequences of instructions contained in the system memory component 810. For example, the processor 814 can perform the use-case scenario testing functionalities described herein according to the process 300.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising: a non-transitory memory; and one or more hardware processors coupled with the non-transitory memory and configured to read instructions from the non-transitory memory to cause the system to perform operations comprising:

receiving an indication of an error associated with performing a function by a first web server for a first user account, in a first computing environment;

deriving a user account configuration based on data associated with the first user account in the first computing environment;

generating a second user account in a second computing environment different from the first computing environment based on the user account configuration, wherein the generating the second user account comprises:

generating fictitious user account data based on the user account configuration and inserting the fictitious user account data into a database associated with the second computing environment; and determining a workflow based on the function associated with the error;

logging into the second user account in the second computing environment by interacting with a second web server of the second computing environment;

executing a series of function calls with the second web server to perform the workflow for the second user account in the second computing environment;

detecting an anomaly based on one or more responses received from the second web server; and presenting the anomaly on a user device;

wherein a plug-in associated with the web browser is configured to interact with the second web server to perform the workflow.

2. The system of claim 1, wherein the operations further comprise:

generating a financial entity account in the second computing environment based on the user account configuration, wherein the generating the financial entity account comprises generating fictitious financial entity account data based on the user account configuration and inserting the fictitious financial entity account data into the database associated with the second computing environment.

3. The system of claim 2, wherein the operations further comprise linking the financial entity account with the second user account.

4. The system of claim 1, wherein the operations further comprise:

generating fictitious credential data for the second user account; and causing the user device to log into the second user account in the second computing environment based on the fictitious credential data.

5. The system of claim 1, wherein the operations further comprise presenting a machine-readable code representing fictitious credential data of the second user account on a user-interface of a first device.

6. The system of claim 5, wherein the operations further comprise:
   receiving the machine-readable code from a second device; and
   in response to receiving the machine-readable code, logging the second device into the second user account in the second computing environment.

7. The system of claim 1, wherein the operations further comprise removing pre-existed user account data from the database associated with the second computing environment before generating the second user account.

8. The system of claim 1, wherein the executing the series of function calls with the second web server comprises causing a web browser of the user device to transmit the series of function calls to the second web server.

9. The system of claim 1, wherein the second computing environment is a test environment, and wherein the first computing environment is a production environment.

10. A method comprising:
   receiving an indication of an error associated with performing a function by a first web server for a first user account in a first computing environment;
   determining a user account configuration based on data associated with the first user account in the first computing environment;
   generating, by one or more hardware processors, a second user account in a second computing environment different from the first computing environment based on the user account configuration, wherein the generating the second user account comprises:
   generating fictitious user account data based on the user account configuration and inserting the fictitious user account data into a database associated with the second computing environment;
   determining a workflow based on the function associated with the error:
   executing, by the one or more hardware processors,
   a series of function calls corresponding to the workflow with the second web server for the second user account in the second computing environment;
   detecting a defect based on one or more responses received from the second web server; and
   presenting the defect on a user device;
   wherein a plug-in associated with the web browser is configured to interact with the second web server to perform the workflow.

11. The method of claim 10, further comprising:
   obtaining user attributes associated with the first user account and bank attributes associated with one or more financial accounts that are linked to the first user account in the first computing environment, wherein the user account configuration is determined further based on the user attributes and the bank attributes.

12. The method of claim 10, wherein the first computing environment is a production computing environment, and wherein the second computing environment is a staging computing environment.

13. The method of claim 10, wherein the detecting the defect comprises comparing an expected response against the one or more responses received from the second web server in the second computing environment; and
   determining a difference between the expected response and the one or more responses based on the comparing.

14. The method of claim 10, further comprising causing an application of the user device to interact with the second web server within the second computing environment.

15. A non-transitory machine-readable medium having stored thereon machine-readable instructions executable to cause a machine to perform operations comprising:
   receiving an indication of an error associated with performing a function by a first web server for a first user account, in a first computing environment;
   deriving a user account configuration based on data associated with the first user account in the first computing environment;
   generating fictitious user account data based on the user account configuration;
   inserting the fictitious user account data into a database associated with a second computing environment different from the first computing environment;
   generating a second user account in the second computing environment based on the derived user account configuration, the generating, and the inserting;
   logging into the second user account in the second computing environment by interacting with a second web server of the second computing environment;
   executing a series of function calls with the second web server to perform a workflow for the second user account in the second computing environment;
   detecting an anomaly based on one or more responses received from the second web server; and
   presenting the anomaly on a user device;
   wherein a plug-in associated with the web browser is configured to interact with the second web server to perform the workflow.

16. The non-transitory machine-readable medium of claim 15, wherein the operations further comprise presenting a machine-readable code representing fictitious login credential of the second user account on a user-interface of a first device.

17. The non-transitory machine-readable medium of claim 16, wherein the operations further comprise:
   receiving the machine-readable code from a second device; and
   in response to receiving the machine-readable code, logging the second device into the second user account in the second computing environment.

18. The non-transitory machine-readable medium of claim 15, wherein the operations further comprise removing pre-existed user account data from the database associated with the fest second computing environment before generating the second user account.

19. The non-transitory machine-readable medium of claim 15, wherein the operations further comprise obtaining user attributes associated with the first
   user account and bank attributes associated with one or more financial accounts that are
   linked to the first user account in the first computing environment, and wherein the user account configuration is derived further based on the user attributes and the bank attributes.

* * * * *

UNITED STATES PATENT AND TRADEMARK OFFICE
CERTIFICATE OF CORRECTION

PATENT NO. : 10,747,658 B2
APPLICATION NO. : 16/194736
DATED : August 18, 2020
INVENTOR(S) : Durga Prasad Raghupathy and Benjamin Jacob White It is certified that error appears in the above-identified patent and that said Letters Patent is hereby corrected as shown below:

In the Claims

Column 22, Line 50; Claim 18: please correct as follows:
with the second computing environment before gener- Signed and Sealed this
Seventeenth Day of November, 2020

Andrei Iancu
*Director of the United States Patent and Trademark Office*